Patented Jan. 9, 1951

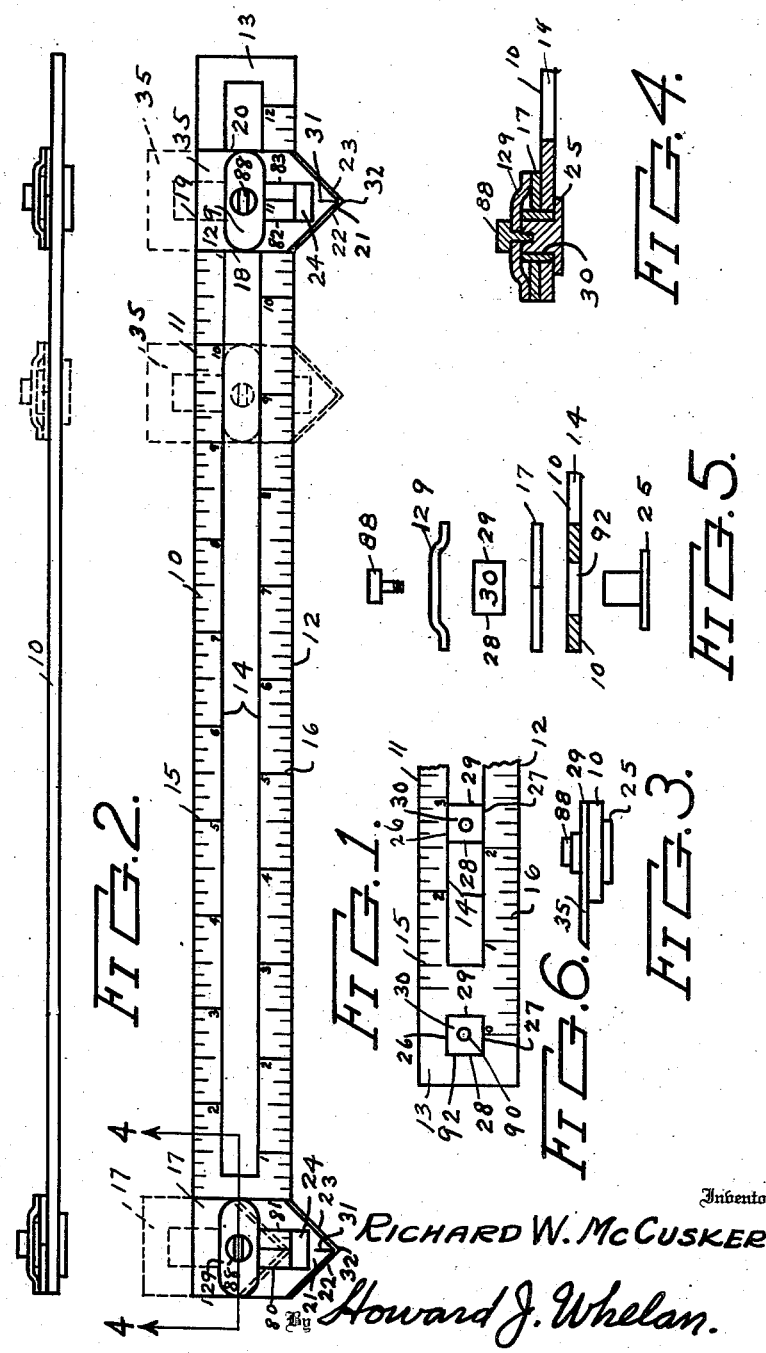

2,537,473

UNITED STATES PATENT OFFICE 2,537,473

HOLE CENTER SCALE

Richard W. McCusker, Pikesville, Md.

Application August 1, 1946, Serial No. 687,731

3 Claims. (Cl. 33—158)

This invention relates to linear measuring devices and especially to those of a calipering nature.

It is an object of this invention to provide a new and improved calipering rule or scale that will avoid one or more of the disadvantages and limitations of the prior art.

A further object of this invention is to provide a new and improved calipering rule or scale that will be easy to use and read accurately, and also facilitate the taking of measurements.

A further object of this invention is to provide a new and improved measurement scale that can be used as a gage for trying distance between holes in a plate.

A further object of this invention is to provide a new and improved hole center scale.

Other objects will become apparent as the invention is described in detail.

For a more comprehensive outline of the invention, reference is made to the attached drawings and the description that follows herein. This outline explains a particular form, by way of example, and illustrates the principles and features involved.

The claims particularly emphasize the scope and spirit of the invention.

The drawings of the invention, show one particular form of the invention, in which:

Figure 1 is a general view of a calipering rule or scale embodying this invention;

Figure 2 is a side view of Figure 1;

Figure 3 is an end view of Figure 2;

Figure 4 is a sectional detail of the marking pointer employed for calipering distances by this rule taken on line 4—4 of Figure 1;

Figure 5 is a blown up view showing the parts separate, and

Figure 6 is a view of Figure 1, with the sliders, springs and adjusting screws removed.

Similar reference number pertains to similar parts throughout the drawings.

In the particular construction shown in the drawings, a rectangular scale 10 is arranged with two straight edge members 11 and 12 joined at the end portions with straight bars 13 at right angles to the edge members mentioned. The edge members and bars in their assembly leave a middle opening 14, longitudinally in between. The scale is measured off into units of length, such as inches and divisions of an inch. These divisions may be varied but are shown in graduated one-eighths of an inch on the drawing. The upper scale markings 15 on the member 11 are begun with "1" at the left end and proceed in proper order along it, towards "12" at the right. The markings 16 on the lower member 12, which begins with the "0" or zero, at a distance of one-half inch from the left. The markings of the two members are therefore out of line by one half the width of the slider which in this case is one-half inch. Travelling along the face of the members are two sliders 17 and 35. These sliders consist of a flat piece of materials square on three sides 18, 19 and 20 respectively, each approximately one-inch long, along their edges. The remaining lateral piece 21 is pointed to an apex from two converging sides 22 and 23 respectively, at an angle of 45°, which are sharply bevelled. A rectangular slot 24 is arranged in the middle portion of each slider, has a bolt 25 within it. A square collar 30 fits on said bolt 25 and has flat surfaces, 26 and 27, 28 and 29 to align the pointers at right angles to the scales. The surfaces 26 and 27 of collar 30 slide along the walls of middle opening 14, longitudinally. The flat surfaces 28 and 29 contact the faces 80, 81, 82 and 83 of the sliders 17 and 35 and guide their movement transversely. When the bolts 25 are tightened, by screwing down on adjusting screws 88, it presses down on the double-bent flat spring 129. This transmits the pressure to its slider and makes the latter bind on the scale, so it cannot be moved, in a normal manner. The square collar 30 fits closely within the opening 14, is encompassed about the bolt by a hole 90 so as to move therewith and guide it straight along the scale. The slider, in each case, is enscribed in the middle with markings 31 to align with the markings on the scales as indicated. The middle marking line of the sliders aligns over its apexed point 32, and is one half inch from its sides 18 and 20. The sides 19 at the rear of the slider, register with the top border line of member 11, and may be positioned above or below said top. One of the collars 30 is positioned in a square hole 92 to align the slider 17 with scale 10.

In the use of the scale, the points 32, are aligned with the two extraneous points to be measured, as a distance apart. When the points 32 are so positioned, the registration of the markings 31, with those markings 15 and 16 on the upper and lower members enable the readings to be made. The measurements are taken from the side 18 of the slider 35 and then the total measurement is read directly on scale 15 where the side 18 aligns therewith. Thus in Figure 1, the measurement calipered, by the points 32 on the sliders is determined by comparing the marking 31 on slider 35 with the graduation 16 on scale 12 or the measurement may be read directly on scale 15 where it is contacted by side 18 of slider 35.

While the device by reason of its construction is able to caliper hole spacings or centers, it may also be used as a straight measuring rule. The use of the upper member is likewise made use of and take the differently spaced markings for other measurements in another manner. It is compact, relatively light, and may be easily carried around without being inconvenient or cumbersome. The device may be handled readily for either vertical or horizontal measuring, and is "set" on a measurement in a very facile manner.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. A scale comprising in combination a plurality of graduation-bearing scales positioned in spaced-apart parallel relation, providing a longitudinal slot between said scales, spacer bars at each end of the bar closing the slot, said bars being at right angles to said scales, there being a square hole in one of said spacer bars, a plurality of square collars positioned in said longitudinal slot and in said square hole respectively, said square collars each having a bore therethrough, a bolt in each bore, sliders having an opening therethrough straddling each bolt, spring members resting on the end of each bolt and holding the sliders in frictional contact with said scales, and screws threadedly engaged in the end of said bolts and pressing against said spring members to control the degree of pressure of said spring members against said scales.

2. A device as set forth in claim 1, one of said sliders being adapted to move longitudinally and transversely in said slot about its associated square collar and the other of said sliders being adapted for transverse movement only about its associated square collar.

3. A scale comprising a plurality of graduation bearing scales positioned in spaced-apart relation and providing a longitudinal slot between said scales, the graduations on said scales being offset in respect to one another, spacer bars at each end of the scales closing the slot, said bars being at right angles to said scales, a pair of sliders mounted on said scales, one of said sliders being secured to one of said spacer bars and the other of said sliders being slidable on said scales, an element carried by the last mentioned slider and guided in the aforesaid longitudinal slot, said sliders being of a width equalling twice the offset of the graduation on the scales, and said sliders having pointed ends extending beyond the scales and located medially of the width of said sliders, whereby readings may be had, in the use of the scales, between said pointed ends on one of said scales and along the side edges of said sliders on the other of said scales.

RICHARD W. McCUSKER.

REFERENCES CITED

The following references are of record in the file of this patent:

UNITED STATES PATENTS

| Number | Name | Date |
|---|---|---|
| 776,897 | Ferris | Dec. 6, 1904 |
| 962,702 | Diracca | June 28, 1910 |
| 1,211,568 | Garrett | Jan. 9, 1917 |
| 1,402,629 | Manly | Jan. 3, 1922 |
| 1,676,360 | Schwartz | July 10, 1928 |
| 2,323,039 | Hill | June 29, 1943 |